United States Patent [19]
Suzuki

[11] Patent Number: 6,055,964
[45] Date of Patent: May 2, 2000

[54] INTERNAL COMBUSTION ENGINE HAVING COMBUSTION HEATER

[75] Inventor: Makoto Suzuki, Mishima, Japan

[73] Assignee: Toyota Jidosha Kabushiki Kaisha, Toyota-shi, Japan

[21] Appl. No.: 09/213,799

[22] Filed: Dec. 17, 1998

[30] Foreign Application Priority Data

Dec. 22, 1997 [JP] Japan ................................. 9-353747

[51] Int. Cl.$^7$ ........................... F02B 29/00; F01M 13/02
[52] U.S. Cl. ................................. 123/550; 123/142.5 R
[58] Field of Search ........................... 123/142.5 R, 550

[56] References Cited

U.S. PATENT DOCUMENTS

| | | |
|---|---|---|
| 2,290,800 | 7/1942 | Spackman . |
| 4,212,162 | 7/1980 | Kobayashi . |
| 4,506,505 | 3/1985 | Melzer ..................................... 60/278 |
| 4,556,171 | 12/1985 | Fukami et al. ..................... 237/12.3 B |
| 4,858,825 | 8/1989 | Kawamura . |
| 4,927,077 | 5/1990 | Okada . |
| 4,993,377 | 2/1991 | Itakura ............................. 123/142.5 R |
| 5,806,479 | 9/1998 | Bauer et al. ..................... 123/142.5 R |
| 5,819,712 | 10/1998 | Cox ........................................ 123/585 |

FOREIGN PATENT DOCUMENTS

| | | |
|---|---|---|
| 572755 | of 0000 | European Pat. Off. . |
| 270277 | 6/1988 | European Pat. Off. . |
| 271999 | 6/1988 | European Pat. Off. . |
| 1497428 | 12/1967 | France . |
| 2068285 | 8/1971 | France . |
| 2381175 | 9/1978 | France . |
| 4411959 | 10/1995 | Germany . |
| 62-75069A | 4/1987 | Japan . |
| 2041081 | 9/1980 | United Kingdom . |
| 1595060 | 8/1981 | United Kingdom . |

OTHER PUBLICATIONS

Patent Abstracts Of Japan, vol. 018, No. 600 (P–1826), Nov. 15, 1994 & JP 06 222867 A (Sharp Corp.), Aug. 12, 1994.

Patent Abstracts Of Japan, vol. 005, No. 033 (M–057), Feb. 28, 1981 & JP 55 160158 A (Nissan Motor Co., Ltd.), Dec. 12, 1980.

Copending U.S. Patent Appln. Ser. No. 09/165,222, filed Oct. 1, 1998.

Copending U.S. Patent Appln. Ser. No. 09/204,895 filed Dec. 3, 1998.

Copending U.S. Patent Appln. Ser. No. 09/193,431 filed Nov. 17, 1998.

Copending U.S. Patent Appln. Ser. No. 09/213,051, filed Dec. 16, 1998.

*Primary Examiner*—Willis R. Wolfe
*Assistant Examiner*—Jason Benton
*Attorney, Agent, or Firm*—Kenyon & Kenyon

[57] ABSTRACT

An internal combustion engine having a combustion heater is constructed to prevent an influence by a blow-by gas and to maintain well the combustion in the combustion heater even when introducing the combustion air of the combustion heater from an intake passage of the internal combustion engine. The combustion heater introduces a fuel by using a pump and the air from an air introducing passage by using a fan, and thus performs a combustion. The air introducing passage is connected to an intake passage. A blow-by gas introducing passage is connected to the intake passage. An aperture, connected to the intake passage, of the blow-by gas introducing passage is disposed more downstream of an intake flow than an aperture, connected to the intake passage, of the air introducing passage. With this configuration, an inflow of the blow-by gas into the combustion heater is restrained, and the combustion can be well maintained.

4 Claims, 3 Drawing Sheets

INTERNAL COMBUSTION ENGINE HAVING COMBUSTION HEATER

BACKGROUND OF THE INVENTION

The present invention relates generally to an internal combustion engine having a combustion heater for heating related elements to the internal combustion engine and, more particularly, to an internal combustion engine having a combustion heater in which the air for combustion is introduced into the combustion heater via an intake passage of the internal combustion engine.

In the internal combustion engine, an operability is deteriorated with an increased friction in a low-temperature state, and with this deterioration a fuel efficiency worsens as well as causing an increase in noises. Further, there arises a problem, wherein a related device operating in connection with the internal combustion engine such as, in a vehicle, for example, a car room heater with the cooling water of the internal combustion serving as a thermal source, is deteriorated in its function when the internal combustion engine is at the low temperature, i.e., when the temperature of the cooling water is low.

Accordingly, it is required that the internal combustion engine be provided with a heating device for increasing the temperature of the internal combustion engine itself or a temperature of the related element to the internal combustion engine itself when in a warm-up process after a start-up or when an exothermic quantity of the engine itself is small. This necessity is remarkable especially in a diesel engine with a small exothermic quantity and becomes more remarkable with a tendency of further gaining the fuel efficiency in recent years.

Such being the case, Japanese Patent Laid-Open Publication No. 62-75069 discloses a technology of enhancing a starting characteristic by speeding up the warm-up of the internal combustion engine. According to this technology, a rise in temperature of the internal combustion engine body is speeded up by speeding up a rise in temperature of the cooling water by providing a combustion heater for heating the cooling water. In this technology, the attention is paid to a temperature when starting the internal combustion engine. In addition to the starting time of the internal combustion engine, however, the temperature of the internal combustion engine becomes comparatively low also when the exothermic quantity of the internal combustion engine itself is small, e.g., when a quantity of fuel burned in the combustion chamber is small. In such a case also, it is advantageous to the internal combustion engine itself or the related element thereto to provide the combustion heater.

Incidentally, although the combustion of the combustion heater continues also during an operation of the internal combustion engine for a short while after the start-up thereof, at this time the combustion heater introduces the combustion air from the intake passage of the internal combustion engine.

On the other hand, in the internal combustion engine, compression leakage of the mixture is protected by a piston ring provided in a gap between the cylinder and the piston. However, since the mixture absorbed in the cylinder is compressed with high pressure, a small quantity of an unburned gas before combustion is blown in a crankcase from the gap between the cylinder and the piston. This is a so-called "blow-by gas". This blow-by gas includes oil in the crankcase. As is well known, a blow-by gas introducing passage for introducing a blow-by gas into the intake passage may be provided in the internal combustion engine, in order that the blow-by gas returns to the cylinder and the unburned gas is burned. However, depending on a position in which to introduce the blow-by gas into the intake passage, there exists such a possibility that the blow-by gas might be introduced together with the combustion air into the combustion heater, and inconveniences such as deteriorations of combustion and of ignition in the combustion heater might be caused due to contaminating components such as an oil contained in the blow-by gas.

SUMMARY OF THE INVENTION

It is an object of the present invention to provide an internal combustion engine having a combustion heater which takes the constructions that follow to accomplish the problems described above.

According to a first aspect of the present invention, an internal combustion engine having a combustion heater, for heating related elements to the internal combustion engine by burning a fuel, provided with an air introducing passage for introducing the air necessary for burning the fuel through an intake passage of the internal combustion engine. The internal combustion engine comprises a blow-by gas introducing passage for introducing a blow-by gas into the intake passage. An aperture, open to the intake passage, of the blow-by gas introducing passage is disposed more downstream of an intake flow than an aperture, open to the intake passage, of the air introducing passage.

According to a second aspect of the present invention, in the internal combustion engine having the combustion heater according to the first aspect of the invention, the combustion heater includes a combustion gas discharge passage for discharging the combustion gas to the intake passage, and an aperture, open to the intake passage, of the combustion gas discharge passage is disposed more downstream of the intake flow than the aperture, open to the intake passage, of the blow-by gas introducing passage.

According to a third aspect of the present invention, in the internal combustion engine having the combustion heater according to the second aspect of the invention, the open-to-intake-passage aperture of the blow-by gas introducing passage is disposed at a wall surface of the intake passage on the side facing, with the intake passage central line interposed therebetween, to the open-to-intake-passage aperture of the combustion gas discharge passage.

These together with other objects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENT

Figure 1:
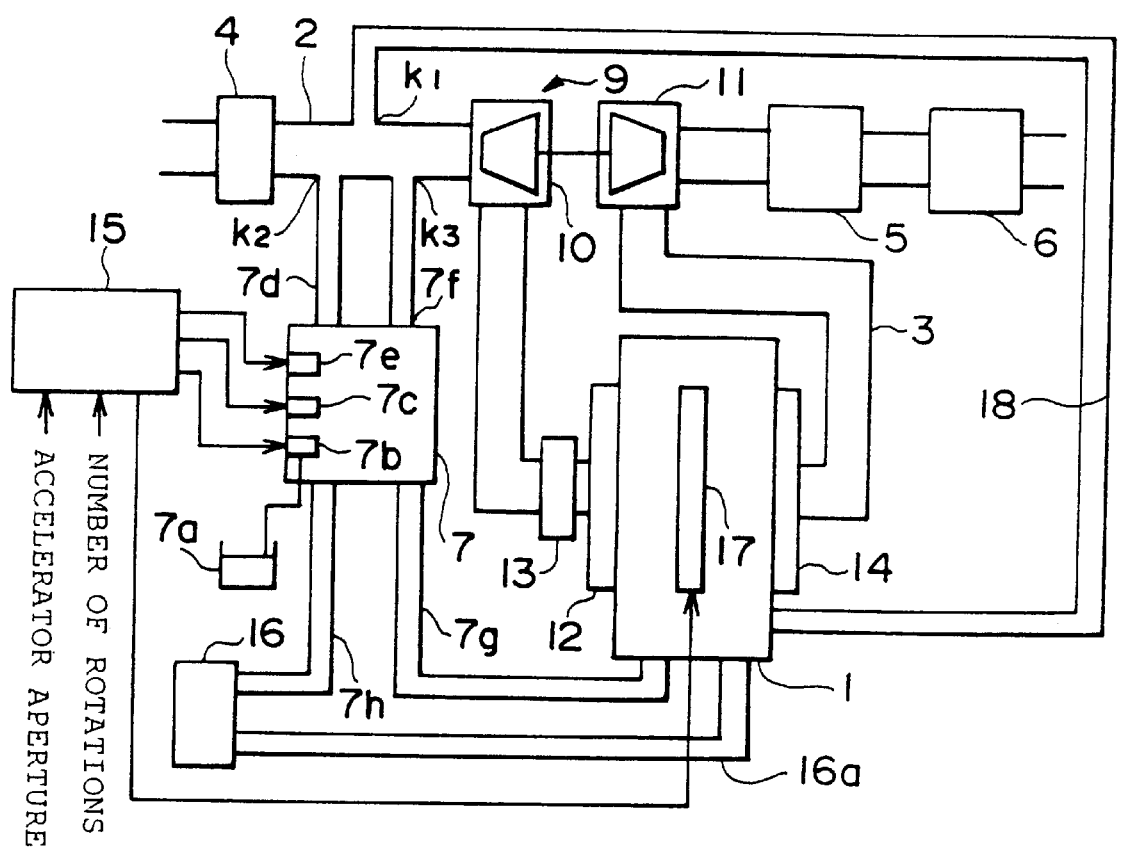
FIG. 1 is a diagram showing a whole diesel engine.

FIG. 1 shows a case where the present invention is applied to a 4-stroke diesel engine for a vehicle.

Referring to FIG. 1, there are illustrated an engine body 1, an intake passage 2, a discharge passage 3, an intake manifold 12 and an exhaust manifold 14, respectively. An air cleaner 4 is provided upstream of the intake passage 2. Further, a catalyst 5 and a silencer 6 are provided downstream of the discharge passage 3. Moreover, in accordance with this embodiment, a turbo charger 9, which is provided as a supercharger, is constructed of a compressor 10 provided on the intake passage 2 between the air cleaner 4 and the intake manifold 12, and of a turbine 11 provided between the exhaust manifold 14 and the catalyst 5. Note that an inter cooler 13 for cooling suction air is provided on the intake passage 2 disposed downstream of the compressor 10.

A combustion heater 7 vaporizes a fuel introduced by a pump 7b from a fuel source 7a with fresh air introduced from an air introducing passage 7d, and burns the vaporized fuel with an ignition by an igniting device 7e. Further, the combustion heater 7 discharges a combustion gas generated when in a burning process via a combustion gas discharge passage 7f. The air introducing passage 7d is connected to an intake passage 2 between the air cleaner 4 and the compressor 10, and the combustion gas discharge passage 7f is connected to the intake passage 2 disposed downstream of the air introducing passage 7d between the air cleaner 4 and the compressor 10.

The cooling water in the cooling water passage (not shown) of the engine body 1 is introduced via a combustion heater cooling water introducing passage 7g into the combustion heater 7. Then, the cooling water introduced into the combustion heater 7 is circulated inside the combustion heater, and receives the heat emitted when in the burning process of the combustion heater 7, of which a temperature thereby rises. Thereafter, the water is discharged via a combustion heater cooling water discharge passage 7h.

Herein, the pump 7b and a fan 7c are constructed so that the numbers of rotations thereof are controllable, and an electronic control unit 15 generates signals for controlling the number of rotations of the pump 7b and the number of rotations of the fan 7c on the basis of the number of engine rotations and an engine fuel injection quantity.

Note that the engine body 1 is supplied with the fuel through a fuel injection valve 17, and a quantity of fuel supplied is controlled by the electronic control unit 15. Further, the fuel supply quantity is set based on an aperture of an unillustrated accelerator as well as on the number of rotations of the engine body 1.

A car room heater designated by 16 functions as a heating device for the car room, by which the cooling water supplied via the combustion heater cooling water discharge passage 7h is internally circulated, and the heat of the cooling water is radiated within the car room. Then, the cooling water circulated in the car room heater 16 is circulated through the cooling water passage of the engine body 1 via a car room heater cooling water discharge passage 16a.

Figure 2:
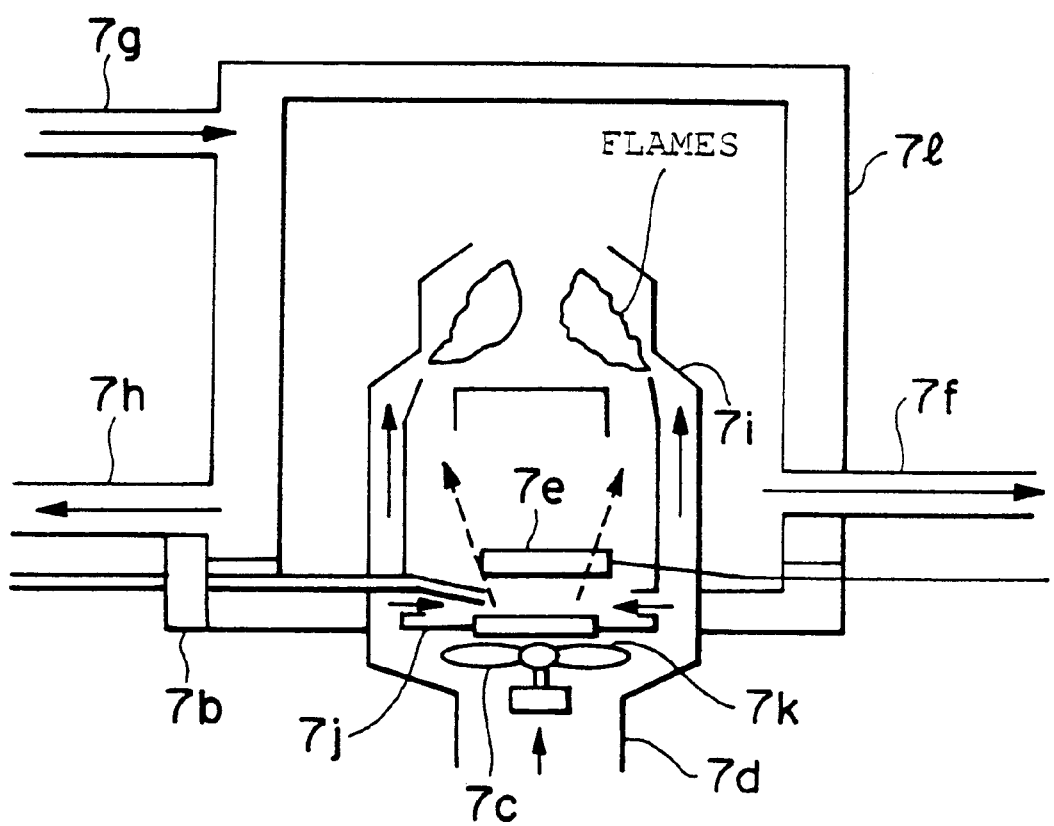
FIG. 2 is a diagram showing a combustion heater in details.

Next, the combustion heater 7 described above will be discussed in greater details referring to FIG. 2.

The air introduced from the intake passage 2 is sucked by the fan 7c via the air introducing passage 7d and flowed through a heater internal air passage 7i. Further, the pump 7b supplies the fuel from the fuel source 7a and feeds the fuel into a fuel vaporizing chamber 7j. The fuel fed into the fuel vaporizing chamber 7j is then supplied to a ceramic cloth 7k and vaporized (as indicated by broken arrow lines in FIG. 2) with the air supplied from the fan 7c, then mixed with the air (as indicated by solid arrow lines in FIG. 2) from the heater internal air passage 7i and thus burned. The combustion gas produced when burned is discharged as an exhaust gas from the combustion gas discharge passage 7f and thereafter introduced into the intake passage 2. It is to be noted that the igniting device 7e is constructed of a ceramic heater. A combustion heater internal cooling water passage 7l is formed in an external portion of the combustion heater 7, and the cooling water introduced via the combustion heater cooling water introducing passage 7g is circulated through the combustion heater cooling water passage 7l, then receives the combustion heat, and is discharged from a combustion heater cooling water discharge passage 7h.

In the thus constructed embodiment, the car room heater 16 can be supplied with the cooling water of which the temperature is increased by the combustion heater 7, whereby a heating effectiveness of the car room heater 7 can be enhanced.

As illustrated in FIG. 1, a blow-by gas introducing passage 18 for introducing into the intake passage 2 the blow-by gas existing inside a crank case of the engine body 1, is connected to the intake passage 2. Then, an aperture k1, connected to the intake passage 2, of the blow-by gas introducing passage 18 is disposed downstream, as viewed in terms of an intake flow, of an aperture k2, connected to the intake passage, of the air introducing passage 7d. Accordingly, the blow-by gas is restrained from introducing into the combustion heater 7 via the air introducing passage 7d, whereby contaminating components such as an oil content of the blow-by gas can be prevented from being adhered to the combustion heater 7. The combustion heater 7 can be thereby well maintained.

Further, the aperture k1 of the blow-by gas introducing passage 18 with respect to the intake passage 2 is disposed upstream of an aperture k3 of the combustion gas discharge passage 7f with respect to the intake passage 2, whereby the combustion gas never flows in close proximity to the blow-by gas introducing passage 18. In other words, the aperture k3 of the combustion gas discharge passage 7f with respect to the intake passage 2 is disposed more downstream of an intake flow than the aperture k1 of the blow-by gas introducing passage 18 with respect to the intake passage 2. A thermal influence of the high-temperature combustion gas upon the blow-by gas introducing passage 18 can be thereby prevented. Accordingly, it is feasible to prevent the oil content in the blow-by gas from being deposited due to the heat of the combustion gas. It is also possible to prevent dogging especially in the vicinity of the aperture k1 of the blow-by gas introducing passage 18 with respect to the intake passage 2.

Further, the aperture k1 of the blow-by gas introducing passage 18 is disposed in the position symmetric to the aperture k3 of the combustion gas discharge passage 7h with respect to the central line of the intake passage 2, i.e., disposed on the side surface opposite to the intake passage 2, and hence a heat transmission quantity of the combustion gas decreases, whereby the thermal influence can be prevented more surely.

Note that the air introducing passage 7d and the combustion gas discharge passage 7f are connected to a portion, exhibiting a small pressure difference, of the intake passage 2, and an ignition characteristic of the igniting device 7e is enhanced in this embodiment. Namely, the air is introduced into the combustion heater 7 by the fan 7c, however, if there is a large pressure difference between connecting points of the air introducing passage 7d and the combustion gas discharge passage 7f to the suction passage 2, a flow rate of the air introduced into the combustion heater 7 increases.

This might lead to such a possibility that the ignition by the igniting device 7e becomes harder because of the vaporizing unit being cooled off or of an increase in flow velocity of the vaporized fuel gas. By contrast, this embodiment takes such a construction that an intake air resisting structure such as, e.g., the air cleaner and the inter cooler etc is not disposed at the connecting points of the air introducing passage 7d and the combustion gas discharge passage 7f to the intake passage 2. With this construction, neither the pressure difference nor the fresh air flow rate becomes excessive. Hence, the favorable ignition characteristic can be kept.

Further, the combustion gas discharge passage 7f may be connected to the discharge passage 3, however, as known well, the discharge passage 3 has a high pressure and further pulsations occurred therein, and hence there might be a possibility in which the combustion heater 1 misfires due to a back-flow of the exhaust gas. In this embodiment, since the combustion gas discharge passage 7f is connected to the intake passage 2, the back-flow described above is not produced, and the misfire can be prevented. Moreover, a thermal energy of the exhaust gas can be collected in the engine body 1 because of the exhaust gas of the combustion heater 7 being introduced into the intake passage 2, and an effect in rising the temperature of the engine body 1 can be further enhanced.

Figure 3:
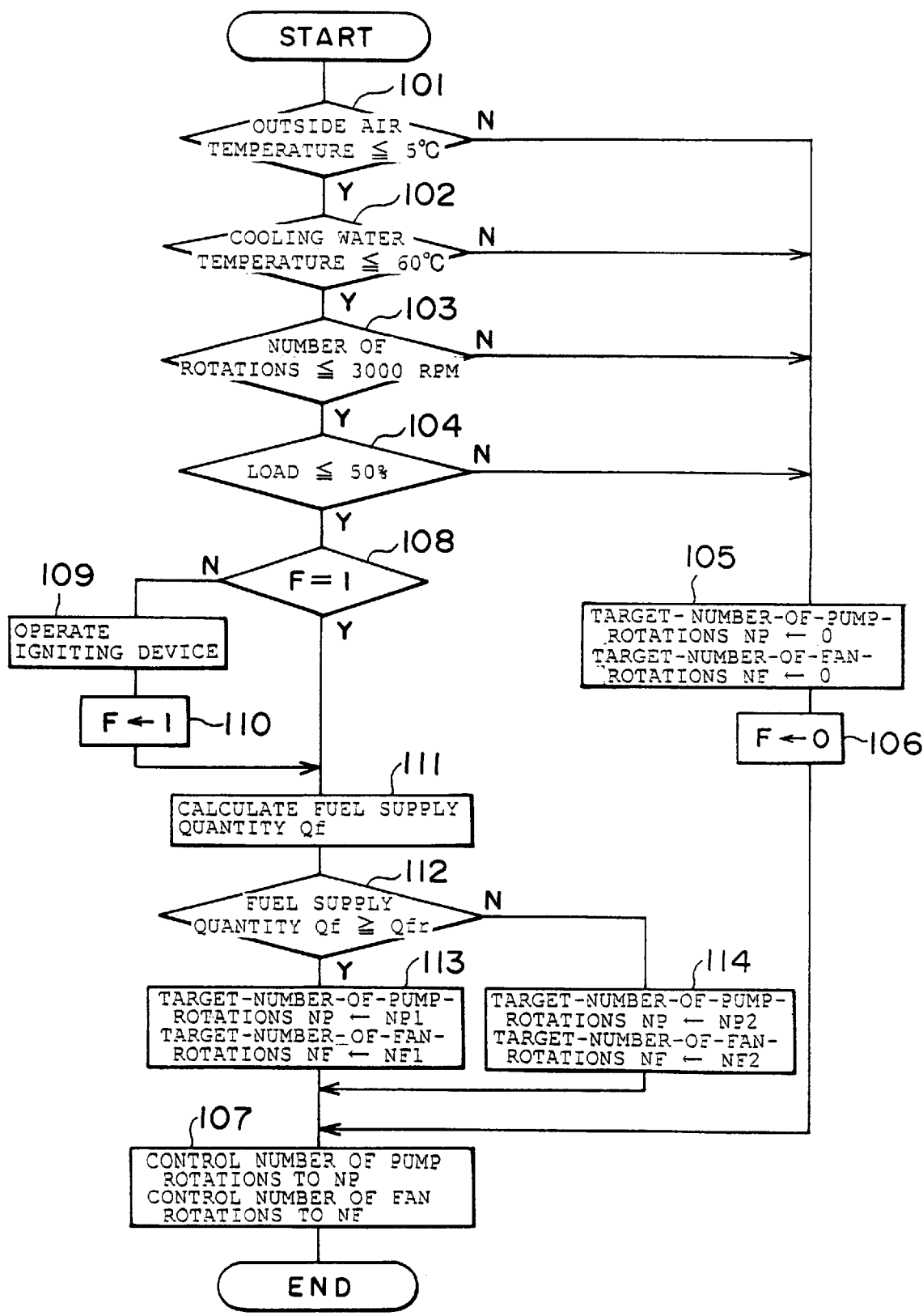
FIG. 3 is a flowchart showing how a combustion heater is controlled.

FIG. 3 is a control flowchart of the pump 7b and the fan 7c of the combustion heater 7. Processing in this flowchart begins with a start-up of the internal combustion engine 1 and is executed at an interval of a predetermined time.

To start with, it is judged in step 101 whether an outside air temperature is 5° C. or under. It is judged in step 102 whether a cooling water temperature is 60° C. or under. It is judged in step 103 whether the number of rotations of the engine body 1 is 3000 rpm or under. It is judged in step 104 whether a load (corresponding to an aperture of the unillustrated accelerator) of the engine body 1 is 50% or under. If judged to be affirmative in all of steps 101–104, the processing proceeds to step 108. If judged to be negative in even one of steps 101–104, the processing advances to step 105. An operation in such a state that all the results in steps 101–104 are judged to be affirmative, implies an operation state where the combustion heater 7 is required to be operated. Namely, if the outside air temperature is low (step 101), if the cooling water temperature is low (step 102), and if the exothermic quantity of the engine body 1 itself is small (steps 103 and 104), it is required that the combustion heater 7 be operated.

Herein, the reason why the combustion heater 7 is required to be operated only when the exothermic quantity of the engine body 1 itself is small as in steps 103 and 104, is that the temperature of the cooling water can be, when the exothermic quantity of the engine body 1 itself is large, increased by this exothermic quantity, and is to relieve an influence of the intake passage 2 upon other devices due to the heat of the exhaust gas because of the structure of introducing the exhaust gas of the combustion heater 7 into the intake passage 2.

If judged to be negative in even any one of steps 101–104, the processing proceeds to step 105, wherein target-number-of-rotations NP, NF of the pump 7b and the fan 7c are set to "0". In step 106, a flag F is set to "0", and the processing advances to step 107. In step 107, the electronic control unit 15 controls the numbers of the rotations of the pump 7b and the fan 7c to the target-number-of-pump-rotations NP and the target-number-of-fan-rotations NF.

If judged to be affirmative in all of steps 101–104, it is judged in step 108 whether or not the flag is "0". If the processing advances to step 108 in a state where the combustion heater 7 does not operate, the flag F is "0", and therefore the judgement is negative. Then, in step 109, the electronic control unit 15 executes such a control process that the ignition device 7e operates for a predetermined period of time. Subsequently, the flag F is set to "1" in step 110, and the processing advances to step 111. If judged to be affirmative in step 108, this implies a state where the combustion of the combustion heater 7 is already executed, and the processing proceeds to step 111 without operating the igniting device 7e.

In step 111, a fuel supply quantity Qf to the engine body 1 is detected. The fuel supply quantity Qf is herein a quantity per one rotation of the engine 1, and is calculated by an unillustrated arithmetic unit from a load and the number of rotations.

When the calculation of the fuel supply quantity Qf is finished in step 111, it is judged in step 112 whether the fuel supply quantity Qf is a judgement value Qfr or above. If the fuel supply quantity Qf is larger than the judgement value Qfr, the processing advances to step 113, wherein the target-number-of-pump-rotations NP is set to NP1 and the target-number-of-fan-rotations NF is set to NF1. Whereas if the fuel supply quantity Qf is smaller than the judgement value Qfr, the processing advances to step 114, wherein the target-number-of-pump-rotations NP is set to NP2 and the target-number-of-fan-rotations NF is set to NF2. Herein, relationships between NP1 and NP2, and between NF1 and NF2 are NP1<NP2, and NF1<NF2.

Then, the target-number-of-pump-rotations NP and the target-number-of-fan-rotations NF are set in step 113 or 114, the processing advances to step 107, in which the electronic control unit 15 controls the number of rotations of the fuel pump and the number of rotations of the fan to the target-number-of-pump-rotations NP and to the target-number-of-fan-rotations NF.

As discussed above, according to the construction in this embodiment, when the fuel supply quantity Qf to the engine body 1 is larger than the judgement value Qfr, the numbers of the rotations of the pump 7b and of the fan 7c are set to the smaller values NP1 and NF1, with the result that the output of the combustion heater 7 decreases and a generation quantity of the exhaust gas decreases. Accordingly, the reduction in the air quantity sucked in the engine can be restrained, and an air/fuel ratio in the combustion chamber is controlled not to be rich, whereby an emission of smokes can be restrained.

According to the present invention, the blow-by gas can be prevented from being introduced into the combustion heater, and the combustion of the combustion heater can be well maintained.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An internal combustion engine having a combustion heater, for heating related elements to said internal combustion engine by burning a fuel, provided with an air introducing passage for introducing the air necessary for burning the fuel through an intake passage of said internal combustion engine, said internal combustion engine comprising:

a blow-by gas introducing passage for introducing a blow-by gas into said intake passage, wherein an aperture, open to said intake passage, of said blow-by gas introducing passage is disposed more downstream of an intake flow than an aperture, open to said intake passage, of said air introducing passage.

2. An internal combustion engine having a combustion heater according to claim 1, wherein said combustion heater includes a combustion gas discharge passage for discharging the combustion gas to said intake passage, and an aperture, open to said intake passage, of said combustion gas discharge passage is disposed more downstream of the intake flow than said aperture, open to said intake passage, of said blow-by gas introducing passage.

3. An internal combustion engine having a combustion heater according to claim 2, wherein said open-to-intake-passage aperture of said blow-by gas introducing passage is disposed at a wall surface of said intake passage on the side facing, with the intake passage central line interposed therebetween, to said open-to-intake-passage aperture of said combustion gas discharge passage.

4. An internal combustion engine having a combustion heater according to claim 1, wherein an intake air resisting structure is not disposed at said intake passage between said aperture of said air introducing passage with respect to said intake passage and said aperture of said combustion gas discharge passage with respect to said intake passage.

\* \* \* \* \*